US012618707B2

(12) United States Patent
Kim et al.

(10) Patent No.: US 12,618,707 B2
(45) Date of Patent: May 5, 2026

(54) METHOD FOR DETERMINING ABNORMAL ACOUSTIC SOURCE AND AI ACOUSTIC IMAGE CAMERA

(71) Applicant: SM INSTRUMENTS CO LTD, Daejeon (KR)

(72) Inventors: Young-Key Kim, Daejeon (KR); In-Keon Kim, Daejeon (KR); Wook-Jin Jeong, Daejeon (KR); Jung-Seop Kim, Daejeon (KR)

(73) Assignee: SM INSTRUMENTS CO LTD, Daejeon (KR)

( * ) Notice: Subject to any disclaimer, the term of this patent is extended or adjusted under 35 U.S.C. 154(b) by 1214 days.

(21) Appl. No.: 17/453,895

(22) Filed: Nov. 8, 2021

(65) Prior Publication Data

US 2022/0381606 A1 Dec. 1, 2022

(30) Foreign Application Priority Data

May 26, 2021 (KR) ........................ 10-2021-0067629

(51) Int. Cl.
*G01H 3/12* (2006.01)
*G06F 18/24* (2023.01)
(Continued)

(52) U.S. Cl.
CPC ............. *G01H 3/125* (2013.01); *G06V 10/12* (2022.01); *G06V 10/40* (2022.01); *G06V 10/764* (2022.01);
(Continued)

(58) Field of Classification Search
CPC ........ G01H 3/125; G06V 10/12; G06V 10/40; G06V 10/764; G06V 20/52; G06V 10/143;
(Continued)

(56) References Cited

U.S. PATENT DOCUMENTS

2007/0038448 A1* 2/2007 Sherony .................. G06F 16/65
704/E11.001
2012/0327745 A1* 12/2012 Yardibi .............. G01R 31/1209
367/121
(Continued)

FOREIGN PATENT DOCUMENTS

CN 105554443 B * 11/2018 ............. G10L 25/51
JP 2012018066 A * 1/2012
KR 10-1213539 B1 12/2012

OTHER PUBLICATIONS

PNSN (What is a Spectrogram, Pacific Northwest Seismic Network, WayBack Machine Archive May 10, 2021, https://web.archive.org/web/20210510084040/https://pnsn.org/spectrograms/what-is-a-spectrogram) (Year: 2021).*
(Continued)

*Primary Examiner* — Lisa M Caputo
*Assistant Examiner* — Christian T Bryant
(74) *Attorney, Agent, or Firm* — WHDA, LLP

(57) ABSTRACT

Disclosed is an AI acoustic camera including an acoustic source localizing means unit of generating position-specific acoustic level data by determining a position of an acoustic source, an AI acoustic analysis unit of recognizing a type of acoustic source estimated as an abnormal acoustic source by extracting a regeneration time domain acoustic signal for the acoustic source with the determined position and AI-learning and recognizing an acoustic feature image of the extracted time domain acoustic signal, an object recognition unit of recognizing a type of object positioned in the acoustic source through image analysis of an area recognized as that the acoustic source is positioned, and a determination unit of determining the acoustic source as a true acoustic source when the type of acoustic source and the type of object have commonality.

18 Claims, 11 Drawing Sheets

(51) Int. Cl.

| | |
|---|---|
| *G06F 18/25* | (2023.01) |
| *G06N 20/00* | (2019.01) |
| *G06V 10/12* | (2022.01) |
| *G06V 10/143* | (2022.01) |
| *G06V 10/40* | (2022.01) |
| *G06V 10/42* | (2022.01) |
| *G06V 10/764* | (2022.01) |
| *G06V 10/82* | (2022.01) |
| *G06V 20/52* | (2022.01) |
| *G08B 21/18* | (2006.01) |
| *G10L 25/18* | (2013.01) |
| *G10L 25/51* | (2013.01) |
| *H04N 5/272* | (2006.01) |
| *H04R 1/24* | (2006.01) |
| *H04R 1/40* | (2006.01) |

(52) U.S. Cl.

CPC ............. *G06V 20/52* (2022.01); *G08B 21/18* (2013.01); *H04N 5/272* (2013.01); *G06F 18/24* (2023.01); *G06F 18/25* (2023.01); *G06N 20/00* (2019.01); *G06V 10/143* (2022.01); *G06V 10/431* (2022.01); *G06V 10/82* (2022.01); *G06V 2201/06* (2022.01); *G10L 25/18* (2013.01); *G10L 25/51* (2013.01); *H04R 1/24* (2013.01); *H04R 1/40* (2013.01)

(58) Field of Classification Search

CPC .. G06V 10/431; G06V 10/82; G06V 2201/06; G08B 21/18; H04N 5/272; G06F 18/24; G06F 18/25; G10L 25/18; G10L 25/51; H04R 1/40; H04R 1/24; G06N 20/00

See application file for complete search history.

(56) References Cited

U.S. PATENT DOCUMENTS

| | | | | |
|---|---|---|---|---|
| 2013/0147835 | A1* | 6/2013 | Lee ........................ | H04R 3/005 |
| | | | | 381/92 |
| 2016/0084729 | A1* | 3/2016 | Huseynov ............... | G01M 3/24 |
| | | | | 73/40.5 A |
| 2016/0277863 | A1* | 9/2016 | Cahill .................... | G01S 3/8083 |
| 2017/0061981 | A1* | 3/2017 | Nakadai ................. | G10L 25/84 |
| 2017/0372571 | A1* | 12/2017 | Brav .................. | G08B 13/1672 |
| 2018/0299527 | A1* | 10/2018 | Helwani ................ | H04R 1/406 |
| 2019/0025400 | A1* | 1/2019 | Venalainen ............ | G06N 20/00 |
| 2019/0261108 | A1* | 8/2019 | Saksela .................. | G01H 3/125 |
| 2020/0051566 | A1* | 2/2020 | Shin ..................... | H03G 3/3005 |

OTHER PUBLICATIONS

Senocak et al. ("Learning to Localize Sound Sources in Visual Scenes: Analysis and Applications," in IEEE Transactions on Pattern Analysis and Machine Intelligence, vol. 43, No. 5, pp. 1605-1619, May 1, 2021, doi: 10.1109/TPAMI.2019.2952095.) (Year: 2021).*

* cited by examiner

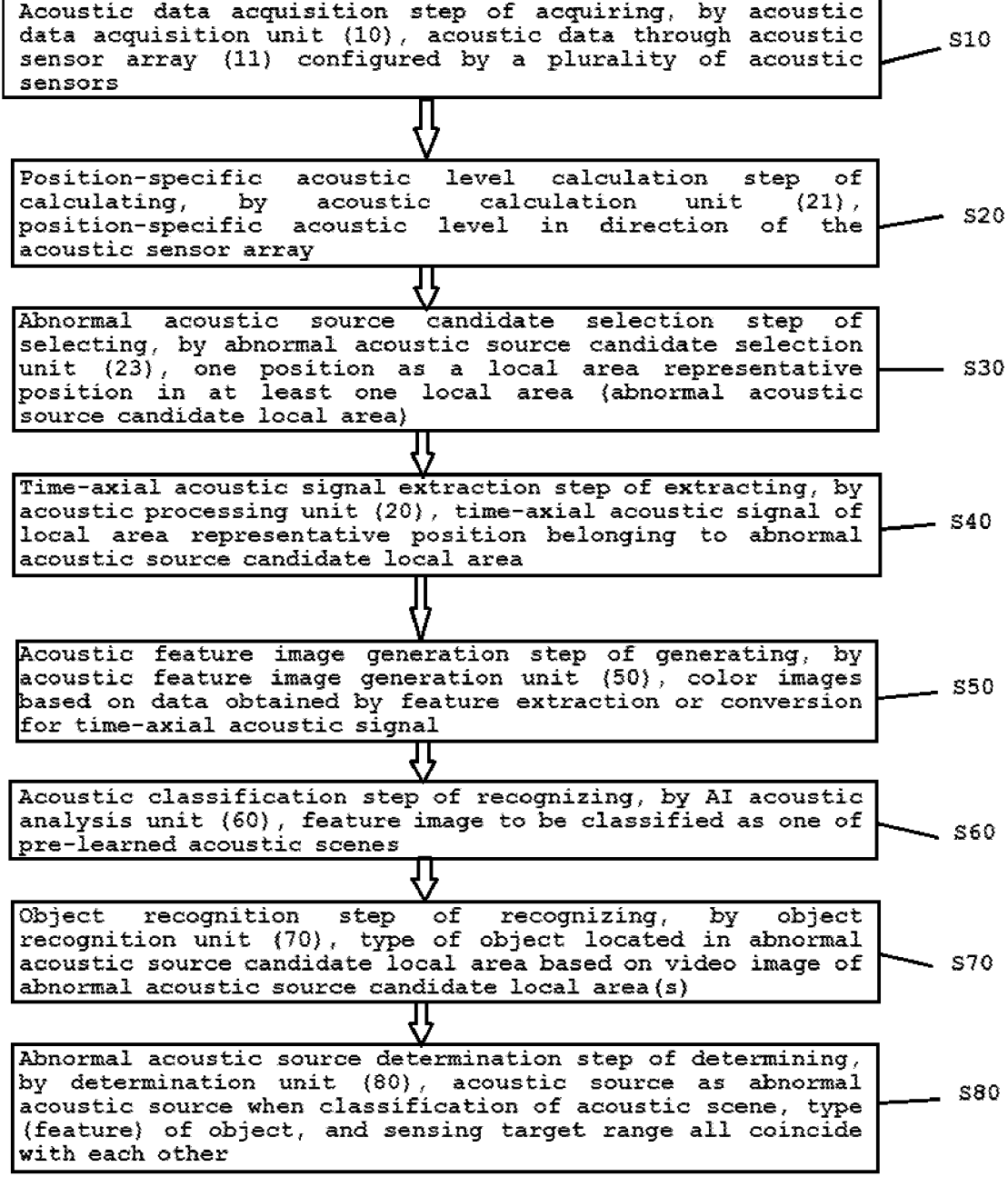

Acoustic data acquisition step of acquiring, by acoustic data acquisition unit (10), acoustic data through acoustic sensor array (11) configured by a plurality of acoustic sensors — S10

Position-specific acoustic level calculation step of calculating, by acoustic calculation unit (21), position-specific acoustic level in direction of the acoustic sensor array — S20

Abnormal acoustic source candidate selection step of selecting, by abnormal acoustic source candidate selection unit (23), one position as a local area representative position in at least one local area (abnormal acoustic source candidate local area) — S30

Time-axial acoustic signal extraction step of extracting, by acoustic processing unit (20), time-axial acoustic signal of local area representative position belonging to abnormal acoustic source candidate local area — S40

Acoustic feature image generation step of generating, by acoustic feature image generation unit (50), color images based on data obtained by feature extraction or conversion for time-axial acoustic signal — S50

Acoustic classification step of recognizing, by AI acoustic analysis unit (60), feature image to be classified as one of pre-learned acoustic scenes — S60

Object recognition step of recognizing, by object recognition unit (70), type of object located in abnormal acoustic source candidate local area based on video image of abnormal acoustic source candidate local area(s) — S70

Abnormal acoustic source determination step of determining, by determination unit (80), acoustic source as abnormal acoustic source when classification of acoustic scene, type (feature) of object, and sensing target range all coincide with each other — S80

FIG. 1A

Time domain signal of one-time repeated pattern (a)1ch measurement signal(non-extraction signal)

(b)Time domain signal extracted through beamforming
using plurity of microphone

<First local area: gas leackage>

<Second local area : background noise>

1

METHOD FOR DETERMINING ABNORMAL ACOUSTIC SOURCE AND AI ACOUSTIC IMAGE CAMERA

CROSS-REFERENCE TO RELATED APPLICATIONS

This application claims the priority of Korean Patent Application No. 10-2021-0067629, filed on 26 May 2021, in the Korean Intellectual Property Office, the disclosure of which is incorporated herein by reference.

FIELD

The present disclosure relates to a method for determining an abnormal acoustic source and an AI acoustic image camera.

BACKGROUND

In Korean Patent Registration No. 10-1213539, there is disclosed an acoustic camera using an MEMS microphone array which includes an acoustic sensing device that is configured to mount a plurality of MEMS microphones on a print circuit board and transmits a signal of a sensed sound; a data collection unit which is connected with the acoustic sensing device and samples an analogue signal for the sound transmitted from the acoustic sensing device to convert the analogue signal to a digital signal for the sound and transmits the converted digital signal to a central processing unit; a central processing unit which is connected with the data collection unit and calculates a noise level based on the digital signal for the sound transmitted from the data collection unit; and a display unit which is connected with the central processing unit and displays the noise level calculated from the central processing unit in colors, wherein the MEMS microphone has 2 to 10 blade portions extended in a radial direction.

The above-described technical configuration is the background art for helping in the understanding of the present disclosure, and does not mean a conventional technology widely known in the art to which the present disclosure pertains.

SUMMARY

An object of the present disclosure is to provide an AI acoustic image camera which determines a position of an acoustic source through an acoustic field visualizing means, extracts and AI-learns time data on the acoustic source with the determined position to recognize a type of acoustic source to be estimated as the acoustic source, recognizes a type of object positioned in the acoustic source through image analysis of an area recognized as that the acoustic source is positioned, and then determines the acoustic source as a true acoustic source when the type of acoustic source and the type of object have commonality.

<Method for Determining Abnormal Acoustic Source>

According to an aspect of the present disclosure, there is provided a method for determining an abnormal acoustic source including: an acoustic source localizing step of calculating a level (size) of an acoustic source for each position based on acoustic data acquired by a plurality of acoustic sensor array; a candidate acoustic source time domain acoustic source signal extraction step of extracting a regeneration time domain acoustic signal of a position estimated as that the acoustic source is present based on the level of the acoustic source for each position; an acoustic feature image generation step of generating a color feature image by extracting a feature of the time domain acoustic source signal of the candidate acoustic source; an AI acoustic classification step of recognizing the acoustic feature image and performing the acoustic classification for the candidate acoustic source by using a pre-learned AI acoustic classification means; and an abnormal acoustic source determination step of determining the acoustic source as the abnormal acoustic source when the acoustic classification for the candidate acoustic source belongs to a predefined monitoring target range.

The method for determining the abnormal acoustic source may further include an object image classification step of determining a type of object located at the candidate acoustic source by video analysis of a candidate acoustic source coordinate or adjacent position, wherein in the abnormal acoustic source determination step, when the acoustic classification and the type of object are included in a predetermined monitoring target range, the acoustic source may be determined as an abnormal acoustic source and an alarm signal may be generated.

According to another aspect of the present disclosure, there is provided a method for determining an abnormal acoustic source including: an acoustic data acquisition step (S10) of acquiring, by an acoustic data acquisition unit, acoustic data through an acoustic sensor array configured by a plurality of acoustic sensors; a position-specific acoustic level calculation step (S20) of calculating, by an acoustic calculation unit of an acoustic processing unit, a position-specific acoustic level in a direction of the acoustic sensor array; an abnormal acoustic source candidate selection step (S30) of selecting, by an abnormal acoustic source candidate selection unit, one position as a local area representative position (e.g., the representative position is a local maximum position) in at least one local area (abnormal acoustic source candidate local area) of grouping positions having acoustic levels exceeding a predetermined (or predefined) level; a regeneration time-axial acoustic signal extraction step (S40) of candidate position(s) of extracting, by the acoustic processing unit, a regeneration time-axial acoustic signal (time signal, time-axial acoustic signal regenerated by time domain beamforming) of a local area representative position belonging to an abnormal acoustic source candidate local area; an acoustic feature image generation step (S50) of generating, by an acoustic feature image generation unit, color images (e.g., spectrogram) based on the data obtained by feature extraction or conversion for the time-axial acoustic signal of the local area representative position; an acoustic classification step (S60) of recognizing, by an AI acoustic analysis unit, the feature image to be classified as one of pre-learned acoustic scenes; and an abnormal acoustic source determination step (S80) of determining, by a determination unit, the candidate local area or local area representative position as the abnormal acoustic source when the classification of the acoustic scene of step S60 coincides with or has relevance with a predefined abnormal acoustic source sensing target (for example, the acoustic scene is gas leakage and the predefined sensing target is gas-related facilities).

The method for determining the abnormal acoustic source may further include an object recognition step (S70) of recognizing, by an object recognition unit, a type of object located in the abnormal acoustic source candidate local area based on the video image in an adjacent area of the abnormal acoustic source candidate local area(s) or the abnormal acoustic source candidate position(s). When the classification of the acoustic scene determined by the AI acoustic analysis unit, the type (feature) of object recognized by the object recognition unit, and the predefined abnormal acoustic source sensing target range all are matched with each other (e.g., the acoustic scene is gas leakage, the object image is a gas pipe, and the sensing target is gas-related facilities), the determination unit may determine the candidate local area or the candidate position as the abnormal acoustic source.

According to yet another aspect of the present disclosure, there is provided a method for determining an abnormal acoustic source including: an acoustic source localizing step of generating a position-specific acoustic level data by determining a position of an acoustic source; an AI acoustic classification step of recognizing a type of acoustic source estimated as an abnormal acoustic source by extracting a regeneration time-axial reference signal for the acoustic source with the determined position to AI-learn and recognize the extracted reference signal; an object type recognition step of recognizing a type of object positioned in the acoustic source through image analysis of an area recognized as that the acoustic source is positioned; and a determination step of determining, by a determination unit, the acoustic source as a true acoustic source when the type of acoustic source and the type of object have commonality.

<AI Acoustic Image Camera>

According to an aspect of the present disclosure, there is provided an AI acoustic camera including an acoustic source localizing means unit of generating position-specific acoustic level data by determining a position of an acoustic source, an AI acoustic analysis unit of recognizing a type of acoustic source estimated as an abnormal acoustic source by extracting a regeneration time domain acoustic signal for the acoustic source with the determined position and AI-learning and recognizing an acoustic feature image of the extracted time domain acoustic signal, an object recognition unit of recognizing a type of object positioned in the acoustic source through image analysis of an area recognized as that the acoustic source is positioned, and a determination unit of determining the acoustic source as a true acoustic source when the type of acoustic source and the type of object have commonality.

According to another aspect of the present disclosure, there is provided an AI acoustic image camera including: an acoustic data acquisition unit that acquires acoustic data through an acoustic sensor array configured by a plurality of acoustic sensors; an acoustic calculation unit of an acoustic processing unit that calculates a position-specific acoustic level in a direction of the acoustic sensor array; an abnormal acoustic source candidate selection unit that selects one position as a local area representative position (e.g., the representative position is a local maximum position) in at least one local area (abnormal acoustic source candidate local area) of grouping positions having acoustic levels exceeding a predetermined (or predefined) level; an acoustic signal extraction unit of the acoustic processing unit that extracts a regeneration time-axial acoustic signal (time signal, time-axial acoustic signal regenerated by time domain beamforming) of a local area representative position belonging to an abnormal acoustic source candidate local area; an acoustic feature image generation unit that generates color images (e.g., spectrogram) based on the data obtained by feature extraction or conversion for the time-axial acoustic signal of the local area representative position; an AI acoustic analysis unit that recognizes the feature image to be classified as one of pre-learned acoustic scenes; and a determination unit that determines the candidate local area or local area representative position as the abnormal acoustic source when the classification of the acoustic scene coincides with or has relevance with a predefined abnormal acoustic source sensing target (for example, the acoustic scene is gas leakage and the predefined sensing target is gas-related facilities).

The AI acoustic image camera may further include an object recognition unit that recognizes a type of object located in the abnormal acoustic source candidate local area based on the video image in an adjacent area of the abnormal acoustic source candidate local area(s) or the abnormal acoustic source candidate position(s), wherein when the classification of the acoustic scene determined by the AI acoustic analysis unit, the type (feature) of object recognized by the object recognition unit, and the predefined abnormal acoustic source sensing target range all are matched with each other (e.g., the acoustic scene is gas leakage, the object image is a gas pipe, and the sensing target is gas-related facilities), the determination unit determines the candidate local area or the candidate position as the abnormal acoustic source.

According to the present disclosure, it is possible to provide an AI acoustic image camera which determines a position of an acoustic source through an acoustic field visualizing means, extracts and AI-learns time data on the acoustic source with the determined position to recognize a type of acoustic source to be estimated as the acoustic source, recognizes a type of object positioned in the acoustic source through image analysis of an area recognized as that the acoustic source is positioned, and then determines the acoustic source as a true acoustic source when the type of acoustic source and the type of object have commonality.

BRIEF DESCRIPTION OF THE DRAWINGS

The above and other aspects, features and other advantages of the present invention will be more clearly understood from the following detailed description taken in conjunction with the accompanying drawings, in which:

FIG. 1A is a flowchart of a method for determining an abnormal acoustic source according to an embodiment of the present disclosure;

DETAILED DESCRIPTION

Figure 1B:
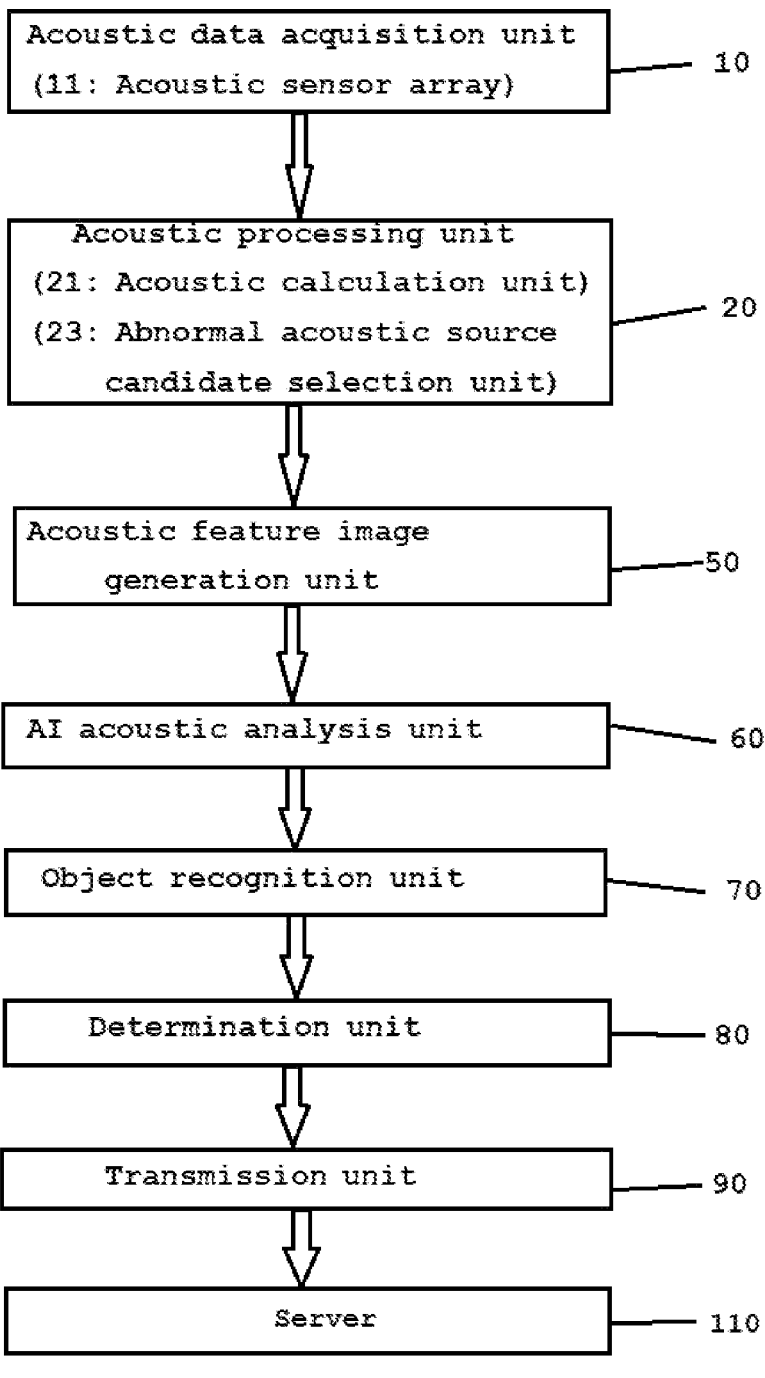
FIG. 1B is a schematic diagram of an AI acoustic image camera according to an embodiment of the present disclosure.
Figure 2A:
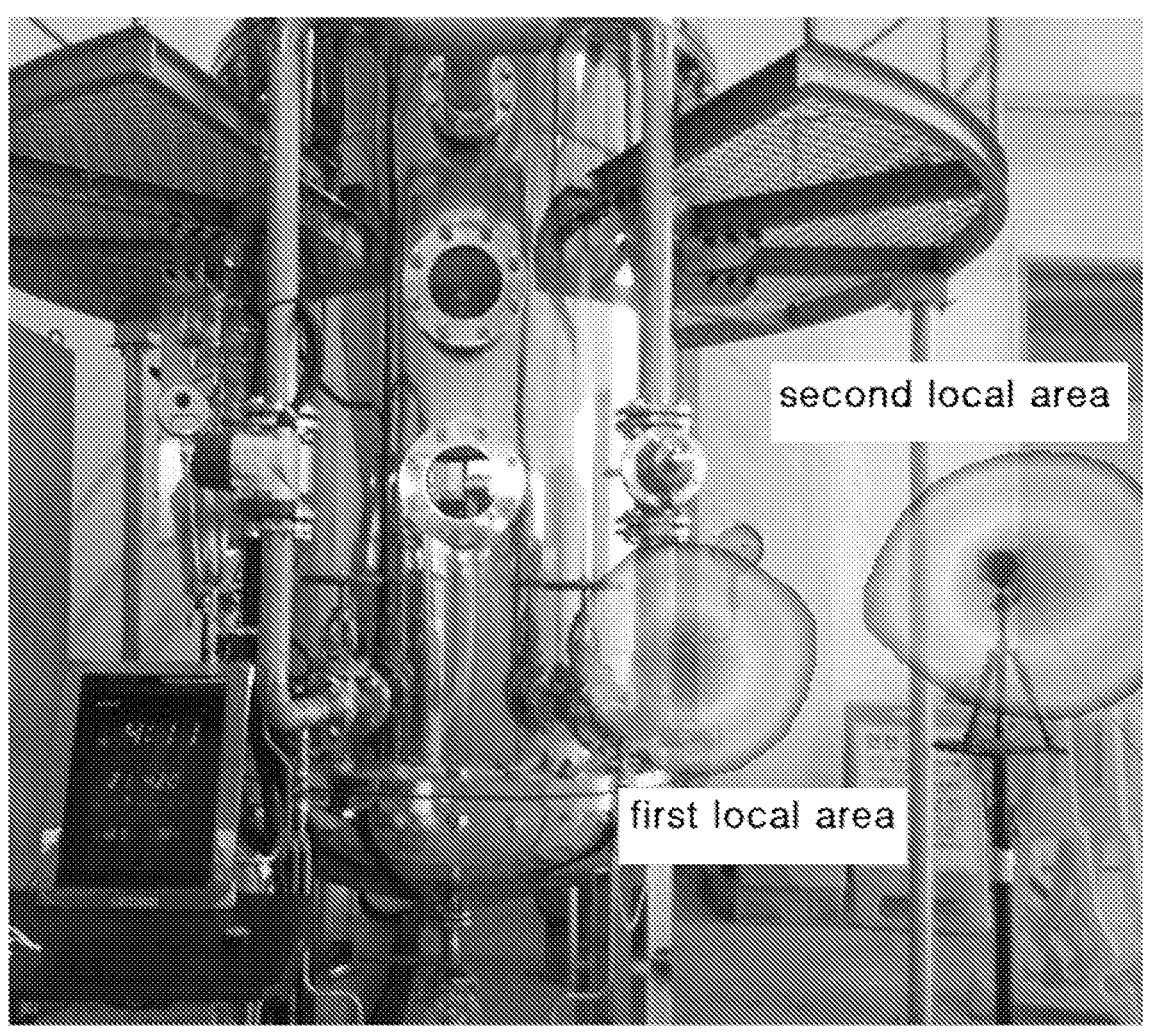
FIGS. 2A, 2B, and 2C are diagrams for describing a process of localizing an acoustic source and selecting an abnormal acoustic source candidate local area (position) according to an embodiment of the present disclosure.
Figure 2B:
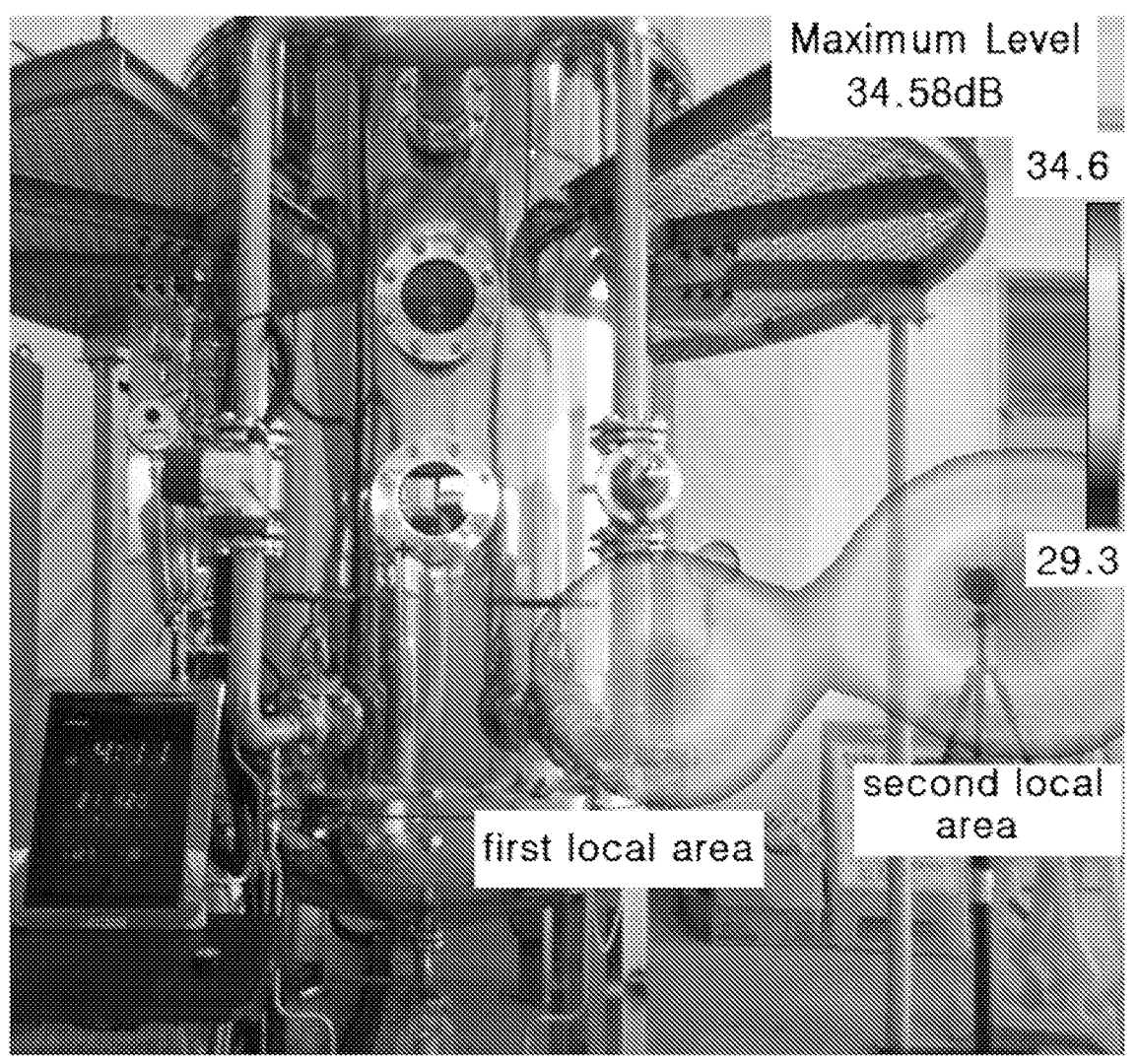
Figure 2C:
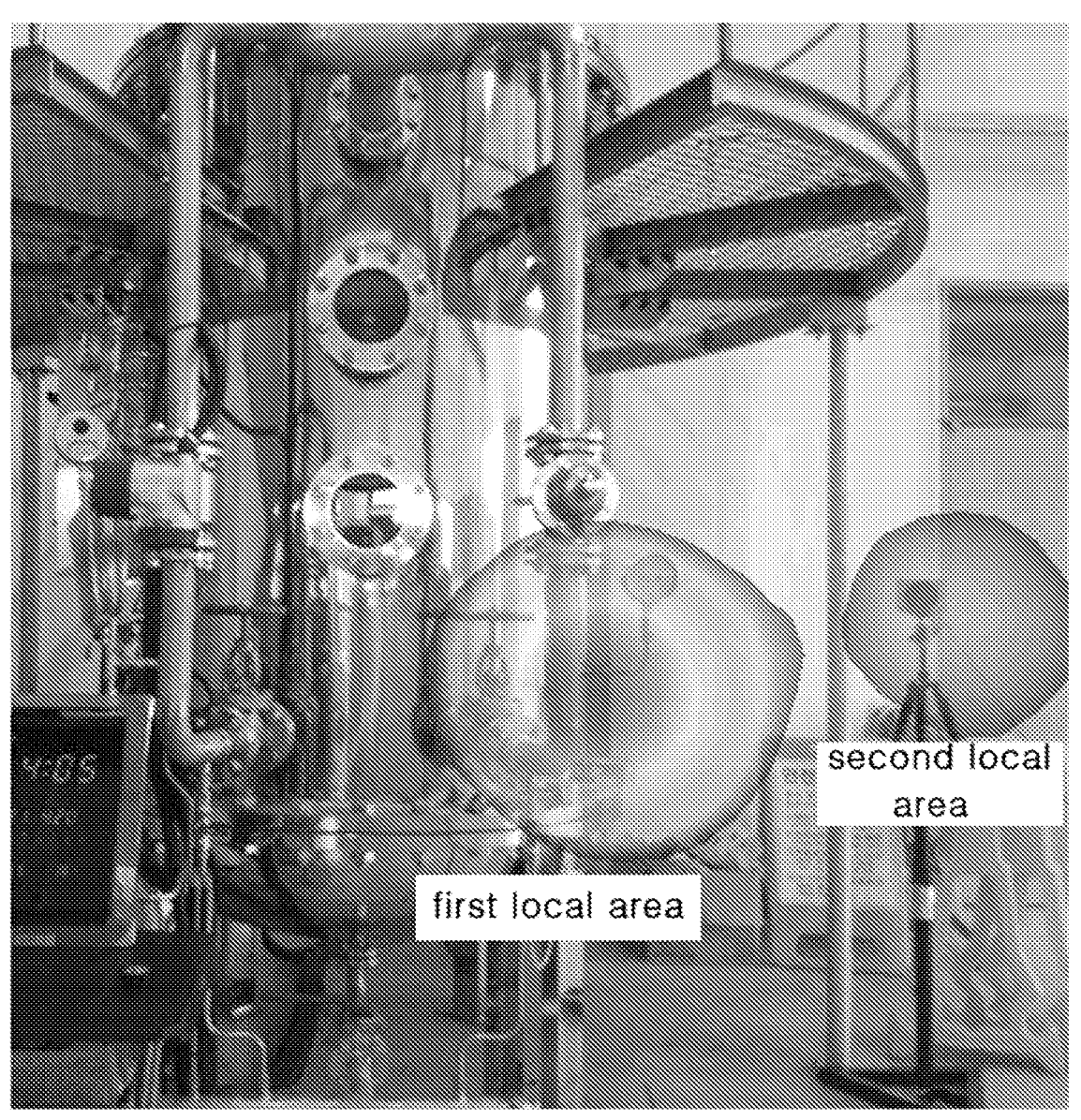
Figure 3:
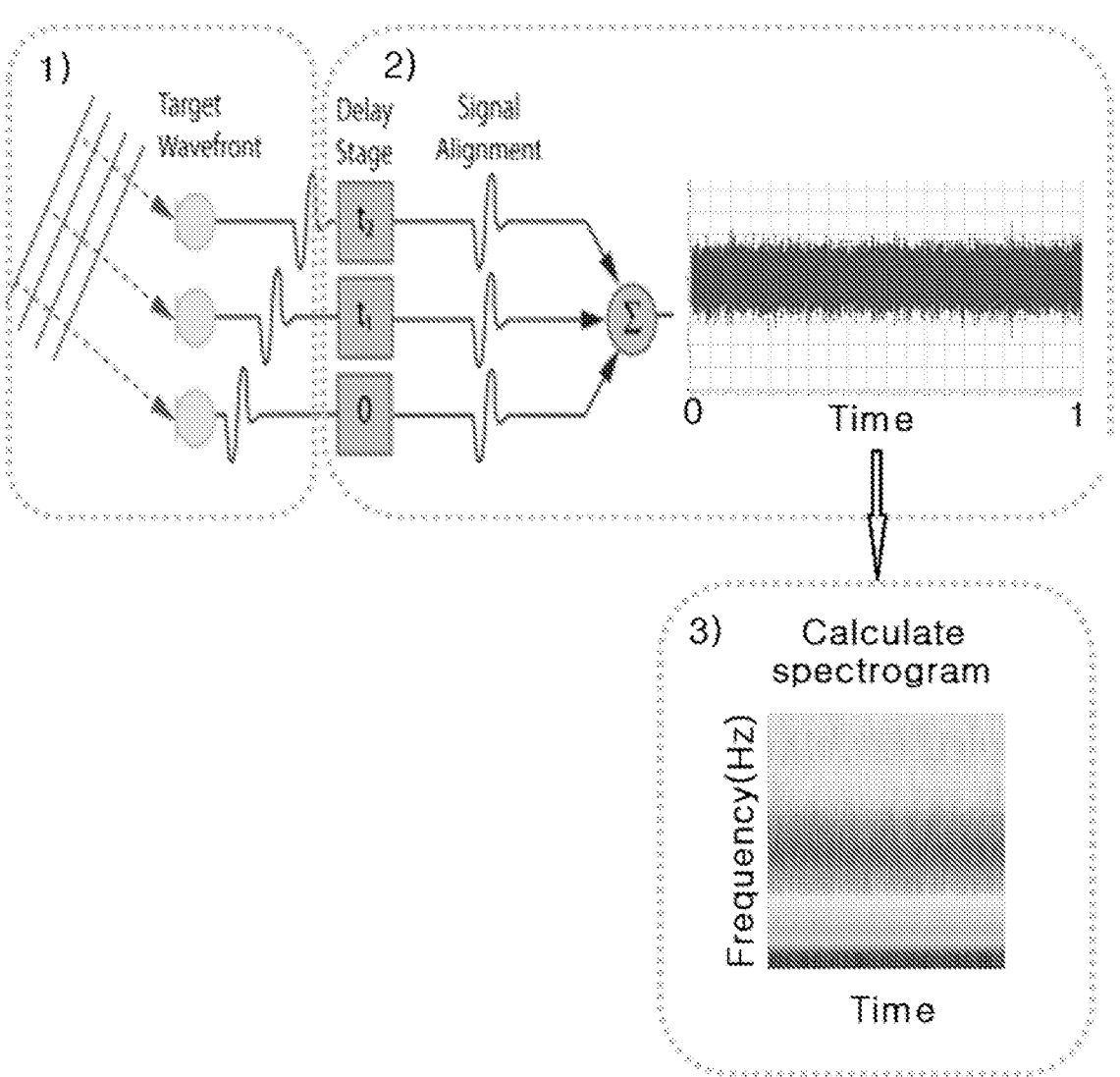
FIG. 3 is a diagram for describing a process of extracting a candidate position time-axial acoustic signal and generating an acoustic feature image according to an embodiment of the present disclosure.
Figure 5A:
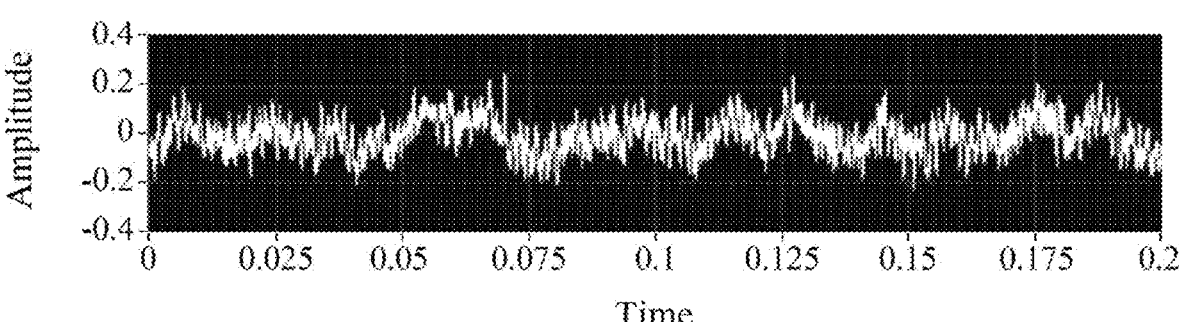
FIGS. 5A and 5B are an exemplary diagram of a general 1-channel time-axial acoustic signal (FIG. 5A) for periodic one-time repeated pattern noise and a time-axial acoustic signal extracted by time domain beamforming according to an embodiment of the present disclosure (FIG. 5B)
Figure 5B:
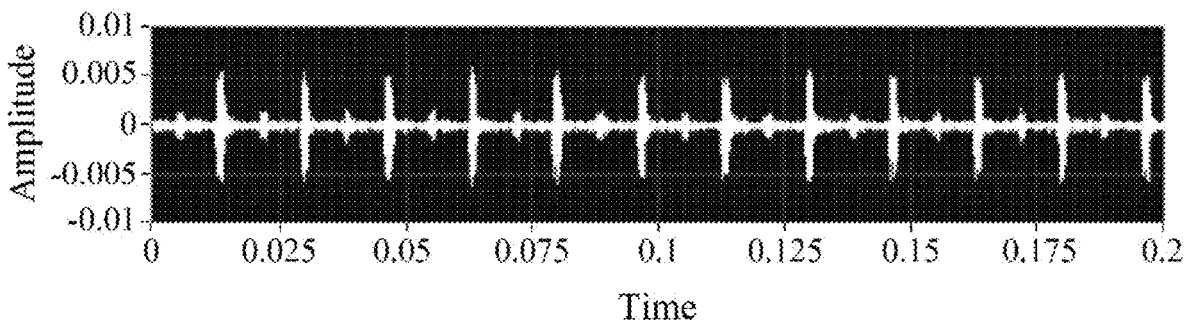
Figure 6A:
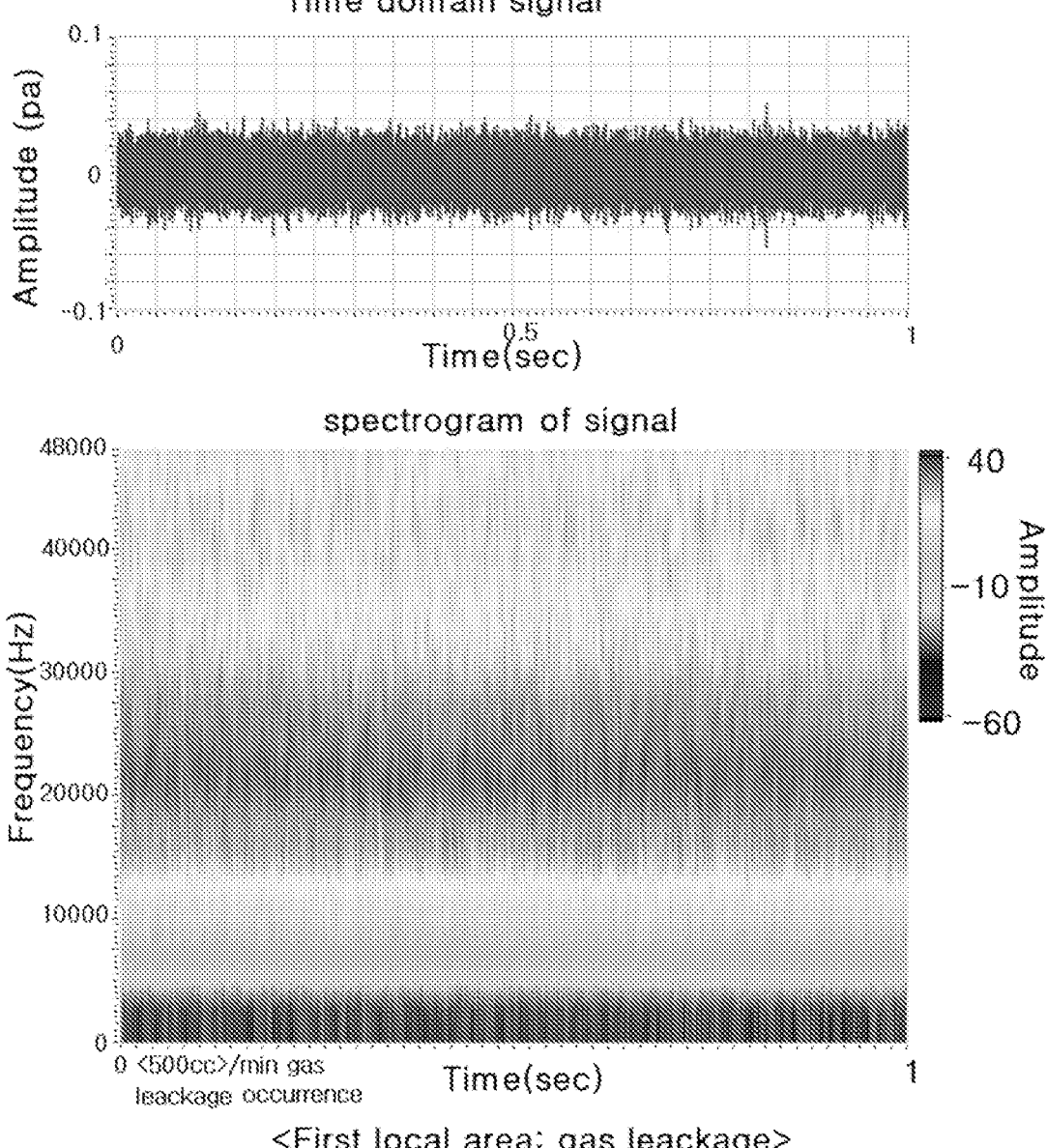
FIGS. 6A and 6B are exemplary diagrams of extracting the candidate position time-axial acoustic signal and generating the acoustic feature image of FIG. 2 (FIG. 6A: gas leakage position, FIG. 6B: background noise)
Figure 6B:
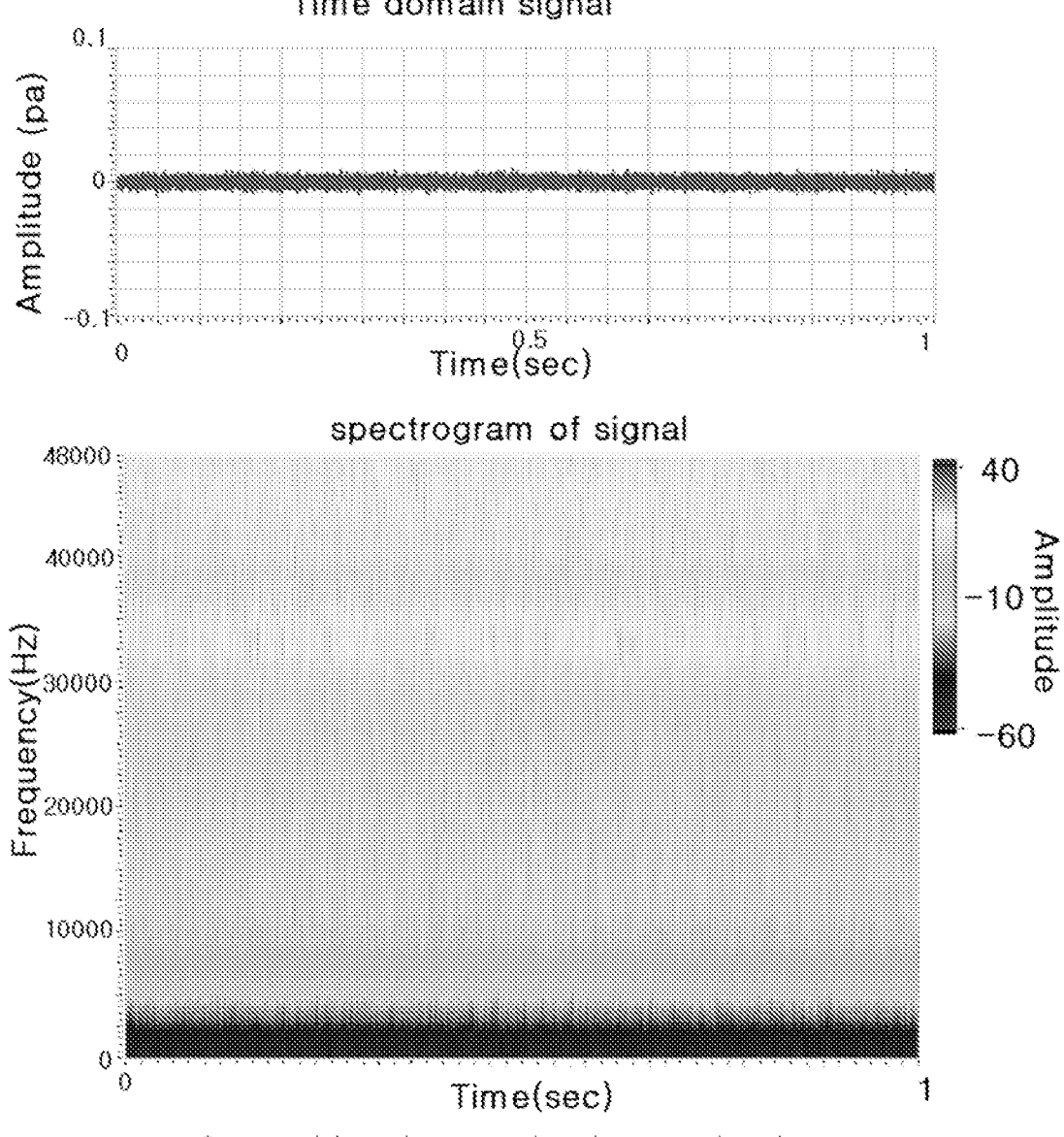

Hereinafter, a method for determining an abnormal acoustic source and an AI acoustic image camera according to an embodiment of the present disclosure will be described in detail with reference to the accompanying drawings. FIG. 1A is a flowchart of a method for determining an abnormal acoustic source according to an embodiment of the present disclosure, FIG. 1B is a schematic diagram of an AI acoustic image camera according to an embodiment of the present disclosure, FIGS. 2A, 2B, and 2C are diagrams for describing a process of localizing an acoustic source and selecting an abnormal acoustic source candidate local area (position) according to an embodiment of the present disclosure, FIG. 3 is a diagram for describing a process of extracting a candidate position time-axial acoustic signal and generating an acoustic feature image according to an embodiment of the present disclosure, FIGS. 4A and 4B are diagrams for describing a process of extracting a candidate position time-axial acoustic signal according to an embodiment of the present disclosure, FIG. 5 is an exemplary diagram of a general 1-channel time-axial acoustic signal (FIG. 5A) for a periodic one-time repeated pattern noise and a time-axial acoustic signal extracted by time domain beamforming according to an embodiment of the present disclosure (FIG. 5B), and FIGS. 6A and 6B are exemplary diagrams of extracting the candidate position time-axial acoustic signal and generating the acoustic feature image of FIG. 2 (FIG. 6A: gas leakage position, FIG. 6B: background noise).

In the present disclosure, an acoustic source includes an ultrasonic acoustic source that belongs to a range of 20 KHz to 100 KHz.

The method for determining the abnormal acoustic source according to an embodiment of the present disclosure optionally includes an acoustic source localizing step, a candidate acoustic source time data extracting step, an acoustic feature image generating step, an AI acoustic classifying step, and an abnormal acoustic source determining step.

As illustrated in FIG. 1A, the method for determining the abnormal acoustic source according to an embodiment of the present disclosure includes an acoustic data acquisition step (S10), a position-specific acoustic level calculation step (S20), an abnormal acoustic source candidate selection step (S30), a candidate position(s) time-axial acoustic signal extraction step (S40), an acoustic feature image generation step (S50), an acoustic classification step (S60), and an abnormal acoustic source determination step (S80). The method for determining the abnormal acoustic source according to an embodiment of the present disclosure optionally includes an object recognition step (S70) and an alarm and transmission step (S90).

As illustrated in FIG. 11B, the AI acoustic image camera of the present disclosure is configured to include an acoustic data acquisition unit 10, an acoustic calculation unit 21 of an acoustic processing unit 20, an abnormal acoustic source candidate selection unit 23, an acoustic signal extraction unit of the acoustic processing unit 20, an acoustic feature image generation unit 50, an AI acoustic analysis unit 60, and a determination unit 80. In addition, the AI acoustic image camera of the present disclosure optionally includes an object recognition unit 70, a transmission unit 90, and a server 110. The AI acoustic image camera of the present disclosure is configured to include an acoustic source localizing means unit, an AI acoustic analysis unit, an object recognition unit, and a determination unit.

a) Localizing of Acoustic Source and Selection of Abnormal Acoustic Source Candidate Local Area Localizing of Acoustic Source First, in the acoustic source localizing step, a level of an acoustic source for each position is calculated based on acoustic data acquired by a plurality of acoustic sensor arrays.

Specifically, in the acoustic data acquisition step (S10), the acoustic data acquisition unit 10 acquires acoustic data through an acoustic sensor array 11 configured by a plurality of acoustic sensors.

Next, in the position-specific acoustic level calculation step (S20), the acoustic calculation unit 21 of the acoustic processing unit 20 calculates a position-specific acoustic level in a direction of the acoustic sensor array. Specifically, the acoustic level is position-specific beam power.

In an embodiment, delay distance calculation of calculating distances between sensors and virtual plane positions is performed using a sensor coordinate and a virtual plane coordinate, time delay correction is applied to each of the acoustic wave signals using the delay distances, and these delay distances are summed to generate acoustic source values of the virtual plane positions. Beam power levels of the generated acoustic source values are calculated and generated.

The contents about the acoustic source localizing (acoustic field visualizing) disclosed in U.S. Pat. No. 10,945,705 B2 (Portable ultrasonic facilities diagnosis device) and Korean Patent No. 10-1976756 (Portable ultrasonic image facilities diagnosis device including electronic means for visualizing radiated ultrasonic waves) registered by applicants of the present disclosure will be disclosed in the specification of the present disclosure.

FIGS. 2A, 2B, and 2C are images showing an acoustic source localizing result according to an embodiment of the present disclosure by overlapping an optical image with an acoustic field visualizing result (position-specific acoustic level, wherein the level is beam power).

The localizing of the acoustic source is performed by a delay-sum beamforming method of detecting a time delay between a position of a signal collected through each sensor included in the sensor array and a sensor and estimating a generation position of the acoustic source in front of the sensor array.

Selection of Abnormal Acoustic Source Candidate

In the abnormal acoustic source candidate selection step (S30), the abnormal acoustic source candidate selection unit 23 selects one position as a local area representative position (e.g., the representative position is a local maximum position) in at least one local area (abnormal acoustic source candidate local area) of grouping positions having acoustic levels exceeding a predetermined (or predefined) level.

As illustrated in FIG. 2A, in an embodiment, there are a first local area (abnormal acoustic source candidate local area) and a second local area of grouping positions having an acoustic level exceeding a predetermined (or predefined) level. Generally, since there is a high possibility that one acoustic source exists in the local area, in the selection of the local area, whether an acoustic level (beam power level) is continuously increased toward a central portion of each local area may be used as a factor (parameter) of whether to select a local area.

For example, it is preferred that a first local area representative position is a position where the beam power level is maximum in the first local area. A representative position may be present in a red part of forming the central portion in the first local area. Even in the second local area, a representative position is selected in the same manner.

b) Extraction of Time Domain Acoustic Signal

A time domain acoustic signal and a time-axis acoustic signal refer to acoustic signals expressed according to a time flow in the same meaning. A vertical axis represents a time axis and a lateral axis represents an amplitude of the acoustic signal.

Next, in the candidate acoustic source time domain acoustic signal extraction step, a regenerated (time domain beam-formed) time domain acoustic signal of a position estimated as that the acoustic source is present is extracted based on the level of the acoustic source for each position. In an embodiment, the position estimated as that the acoustic source is present may be a representative position, or a maximum level position of the local area.

In the time-axial acoustic signal extraction step (S40), the acoustic processing unit 20 extracts a time-axial acoustic signal (time signal, time domain beamformed time-axial acoustic signal) of a local area representative position belonging to an abnormal acoustic source candidate local area.

In the present disclosure, the "regenerated time domain acoustic signal of the position" means a time-axial reference acoustic signal generated by an acoustic method or a beam-forming method of reconfiguring an acoustic source of a specific position (or specific direction) using a plurality of acoustic sensors.

As illustrated in FIG. 3, the regeneration of the time-axial acoustic signal may be performed by a delay beam summing method. A delay distance between each of sensors config-uring the sensor array and a local area representative posi-tion is calculated, the signal is corrected by applying time delay to an acquisition signal of each sensor by the delay distance, and the corrected signals are summed to generate a time-axial signal for the representative position.

In the time-axial acoustic signal extraction step (S40), in the position-specific acoustic level calculation step (S20), that is, the acoustic source localizing step, an acoustic signal located in the representative position is extracted (selected) and produced from acoustic signals of each position regen-erated by the time domain beamforming.

Figure 4:
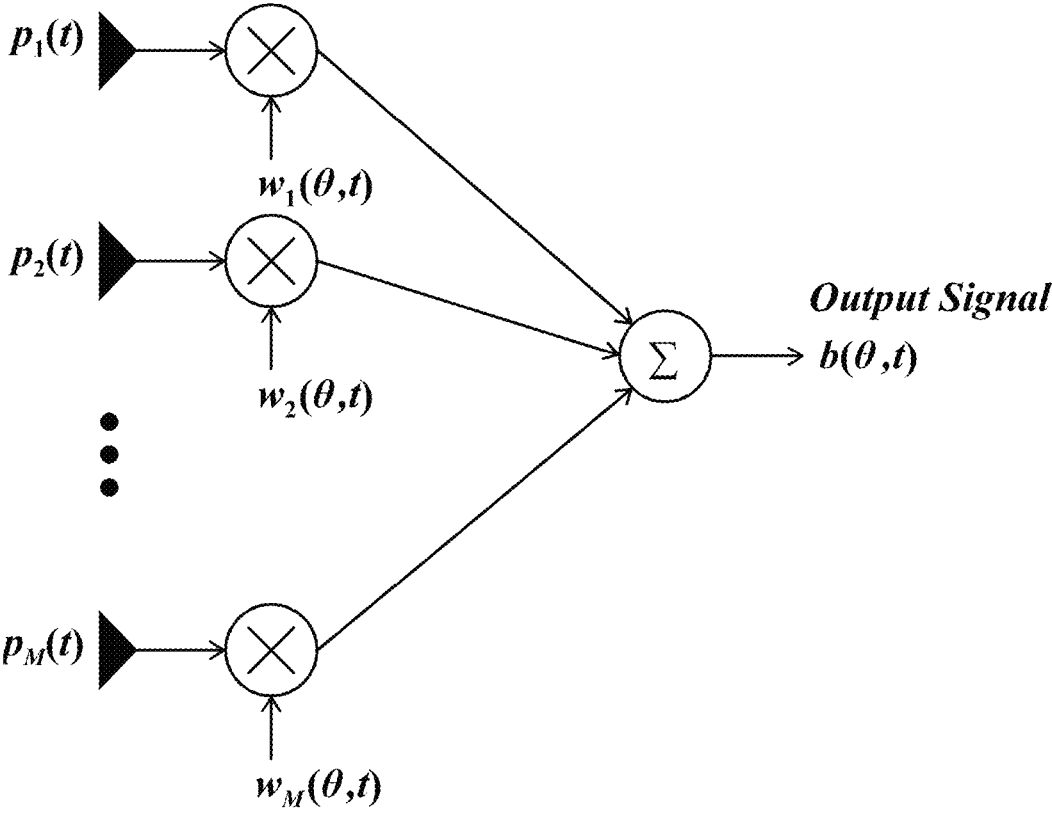
FIG. 4 is a diagram for describing a process of extracting a candidate position time-axial acoustic signal according to an embodiment of the present disclosure.

FIG. 4 illustrates an embodiment of a time domain beamforming, that is, time domain signal regeneration pro-cess according to an embodiment of the present disclosure.

An acoustic pressure signal reaching a microphone is $$p(t)=[p_1(t),p_2(t), \ldots , p_M(t)]^T.$$

Scan vectors (delay time) for each position and each time are $$w(\theta, t) = [w_1(\theta, t), w_2(\theta, t), \ldots , w_M(\theta, t)]^T$$
$$w_m(\theta, t) = \frac{1}{M} \cdot \frac{1}{2\pi} \int_{-\infty}^{\infty} e^{-i\omega\Delta\tau(m-1)sin\theta}e^{-i\omega t}d\omega$$
$$= \frac{1}{M}\delta(t + \Delta\tau(m - 1)sin\theta)$$

A delay-sum beamforming output signal, that is, a regen-eration time domain acoustic signal is $$b(\theta, t) = \frac{1}{M}\sum_{m=1}^{M} p_m(t - \Delta\tau(m - 1)sin\theta).$$

8

Wherein, M represents a microphone channel number and θ represents an incident angle of the acoustic source.

FIG. 5 shows a time domain acoustic signal of a one-time repeated pattern. FIG. 5A illustrates a signal measured directly by a single channel and FIG. 58 illustrates a time domain acoustic signal regenerated through beamforming by using a plurality of acoustic sensors (microphones) like the present disclosure. As such, a feature of the time domain signal is magnified by extracting the time signal for the position and expressed as an acoustic feature image to be recognized by AI acoustic analysis.

c) Generation of Acoustic Feature Image

As illustrated in FIGS. 3, 6A and 6B, in the acoustic feature image generation step, an acoustic feature is extracted from a time domain acoustic signal of a candidate acoustic source to generate a color feature image.

As illustrated in FIGS. 1, 3, and 6A and 6B, in the acoustic feature image generation step (S50), the acoustic feature image generation unit 50 generates color images (e.g., spectrogram) based on the data obtained by feature extrac-tion or conversion for the time-axial acoustic signal of the local area representative position.

FIG. 6A shows a time-axial acoustic signal (time domain acoustic signal) and a spectrogram of one candidate position (first local area, gas leakage position, 500 cc/min) in the embodiment of FIG. 2. FIG. 6B shows a time-axial acoustic signal (time domain acoustic signal) and a spectrogram of one candidate position (background noise simulation unit, second local area) in the embodiment of FIG. 2.

The acoustic feature image generation unit 50 may image at least one feature parameter selected from Discrete Wave-let Transform (DWT), Multi-resolution Short-Time Fourier Transform, mel filterbank, log mel filterbank energy applied with log, mel-frequency filterbank conversion, and multi-resolution log-mel spectrogram through log conversion to be generated as input and learning data.

d) AI Acoustic Classification

In the AI acoustic classification step, the acoustic feature image is recognized and the acoustic classification for the candidate acoustic source is performed by using a pre-learned AI acoustic classification means.

In the acoustic classification step (S60), the AI acoustic analysis unit 60 recognizes the feature image to be classified as one of pre-learned acoustic scenes. For example, the AI acoustic analysis unit 60 may perform acoustic classification for the candidate acoustic source by a convolutional neural network (CNN) trained using an acoustic feature image.

e) Object Recognition

In the object image classification step, a type of object located at the candidate acoustic source is determined by video analysis of a candidate acoustic source coordinate or adjacent position. In the abnormal acoustic source determi-nation step, when the acoustic classification and the type of object are included in a predetermined monitoring target range, the acoustic source is determined as an abnormal acoustic source and an alarm signal is generated.

In the object recognition step (S70), the object recognition unit 70 recognizes a type of object located in the abnormal acoustic source candidate local area based on the video image in an adjacent area of the abnormal acoustic source candidate local area(s) or the abnormal acoustic source candidate position(s).

Figure 7:
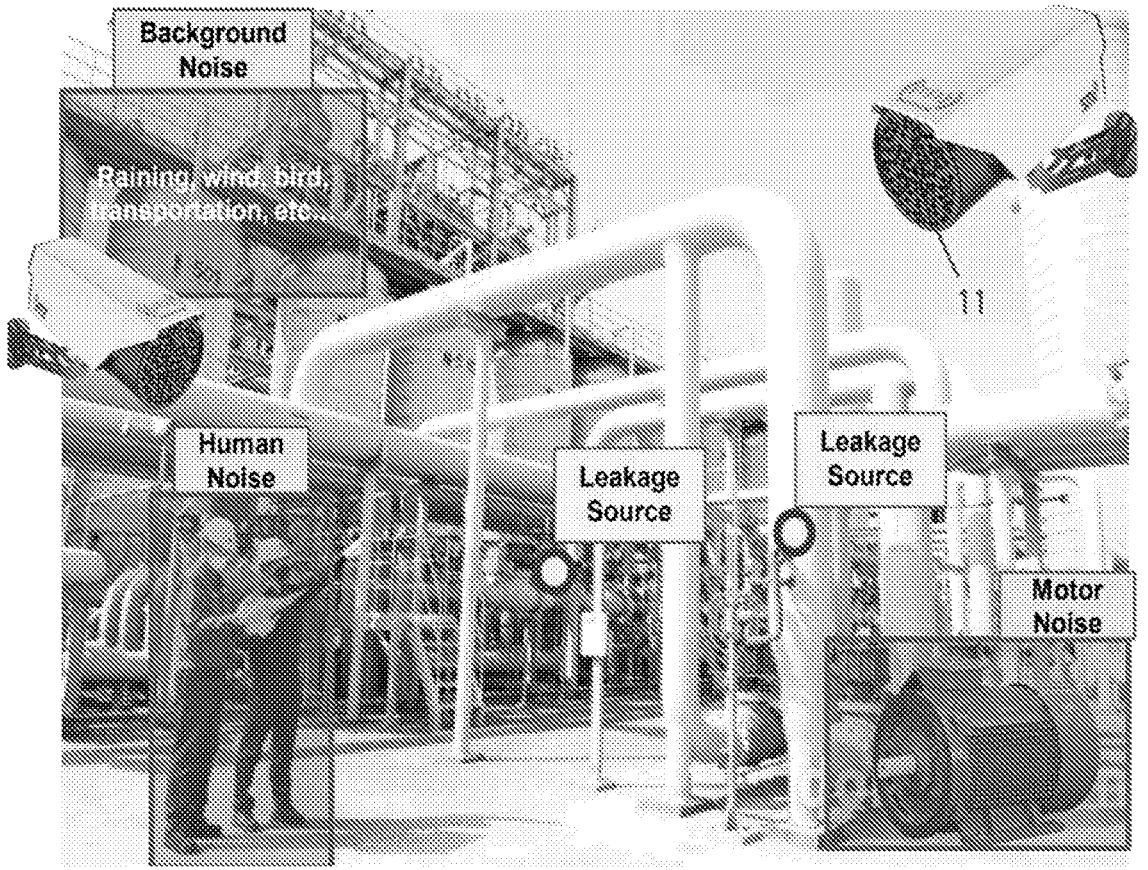
FIG. 7 is a used state diagram of the present disclosure.

For example, the object recognition unit 70 includes a convolutional neural network (CNN) pre-learning images of facilities, environments, and humans and may be an AI means which receives a video image of an adjacent area of the abnormal acoustic source candidate position(s) to determine a type (facility, human, pipe, motor, machine, transformer, and power line). FIG. 7 shows a used state diagram of the present disclosure and shows a video image showing gas facilities, humans, motor facilities, and the like and shows an abnormal acoustic source candidate local area (noise generation local area).

f) Determination

In the abnormal acoustic source determination step, when the acoustic classification for the candidate acoustic source belongs to a predefined monitoring target range, the acoustic source is determined as the abnormal acoustic source.

As illustrated in FIG. 1, in the abnormal acoustic source determination step (S80), when the classification of the acoustic scene of step S60 coincides with or has relevance with a predefined abnormal acoustic source sensing target (for example, the acoustic scene is gas leakage and the predefined sensing target is gas-related facilities), the candidate local area or local area representative position is determined as the abnormal acoustic source.

In the case of including the object recognition step (S70) by the object recognition unit 70, when the classification of the acoustic scene determined by the AI acoustic analysis unit 60, the type (feature) of object recognized by the object recognition unit 70, and the predefined abnormal acoustic source sensing target range all are matched with each other (e.g., the acoustic scene is gas leakage, the object image is a gas pipe, and the sensing target is gas-related facilities), the determination unit 80 determines the candidate local area or the candidate position as the abnormal acoustic source.

e) Alarm and Transmission

As illustrated in FIG. 1, in the alarm and transmission step (S90), when the abnormal acoustic source candidate local area or the abnormal acoustic source candidate position is determined as the abnormal acoustic source, the determination unit 80 generates an alarm signal. The transmission unit 90 transmits optical acoustic image information of overlapping an optical video image with an acoustic field visualizing image generated by the acoustic calculation unit 21 to the server 110.

While the present disclosure has been described in connection with the preferred embodiments described above, the scope of the present disclosure is not limited to these embodiments, and the scope of the present disclosure will be defined by the appended claims and will include various changes and modifications belonging to an equivalent scope to the present disclosure.

The reference numerals described in the following claims are intended to simply assist in the understanding of the present disclosure and should not be impacted in the interpretation of the scope of the present disclosure, and the scope of the present disclosure should not be construed as narrower by the described reference numerals.

What is claimed is:

1. A method for determining an abnormal acoustic source using artificial intelligence, the method comprising:

an acoustic data acquisition step of acquiring acoustic data through an acoustic sensor array;

an abnormal acoustic source candidate local area selecting step of selecting at least one abnormal acoustic source candidate local area, in which at least one abnormal acoustic source candidate position forms a group, based on the acquired acoustic data;

an acoustic feature image generating step of generating an acoustic feature image from a signal extracted from the abnormal acoustic source candidate local area, wherein the signal includes a time-domain acoustic signal;

an acoustic scene classifying step of classifying the acoustic feature image as one of at least one pre-learned acoustic scene;

an object type recognizing step of recognizing a type of object located in the abnormal acoustic source candidate local area based on an object image of the abnormal acoustic source candidate local area or an object image of an area adjacent to the abnormal acoustic source candidate position; and a determining step of determining whether the abnormal acoustic source candidate local area or abnormal acoustic source candidate position is an abnormal acoustic source based on the classified acoustic scene and the recognized object type, wherein the acoustic feature image generating step further comprises:

a step of extracting a time-domain acoustic signal of a representative position belonging to the abnormal acoustic source candidate local area; and a step of generating the acoustic feature image from the time-domain acoustic signal of the representative position, wherein the representative position is a local maximum position of the abnormal acoustic source candidate local area.

2. The method of claim 1, wherein the abnormal acoustic source candidate local area selecting step further comprises a step of selecting at least one abnormal acoustic source candidate local area, in which abnormal acoustic source candidate positions having sound levels exceeding a predefined value form a group.

3. The method of claim 1, wherein the abnormal acoustic source candidate local area selecting step uses whether an acoustic level gradually increases toward a central portion of the abnormal acoustic source candidate local area as a parameter for selecting the abnormal acoustic source candidate local area.

4. The method of claim 1, wherein the acoustic feature image generating step further comprises generating the acoustic feature image by imaging at least one feature parameter selected from a discrete wavelet transform (DWT), multi-resolution short-time Fourier transform, mel filterbank, log mel filterbank energy, mel-frequency filterbank conversion, and multi-resolution log-mel spectrogram.

5. The method of claim 1, wherein the acoustic scene classifying step is performed using an artificial intelligence model learned to classify the acoustic scene from the acoustic feature image.

6. The method of claim 1, wherein the object type recognizing step is performed using an artificial intelligence model learned to classify the object type from the object image.

7. The method of claim 1, the method further comprises an alarm signal generating step of generating an alarm signal when the abnormal acoustic source candidate local area or the abnormal acoustic source candidate position is determined to be an abnormal acoustic source.

8. The method of claim 1, the method further comprises a step of generating an optical-acoustic image by overlapping an optical video image with an acoustic field visualizing image.

9. The method of claim 1, wherein the determining step further comprises a step of determining the abnormal acoustic source if the classification of the acoustic scene, the type of the recognized object, and a predefined monitoring target range are all matched.

10. An AI (Artificial Intelligence) acoustic image camera comprising:

an acoustic data acquisition unit configured to acquire acoustic data through an acoustic sensor array;

an abnormal acoustic source candidate local area selecting unit configured to select at least one abnormal acoustic source candidate local area, in which at least one abnormal acoustic source candidate position forms a group, based on the acquired acoustic data;

an acoustic feature image generation unit configured to generate an acoustic feature image from a signal extracted from the abnormal acoustic source candidate local area, wherein the signal includes a time-domain acoustic signal;

an acoustic analysis unit configured to classify the acoustic feature image as one of at least one pre-learned acoustic scene;

an object recognition unit configured to recognize a type of object located in the abnormal acoustic source candidate local area based on an object image of the abnormal acoustic source candidate local area or an object image of an area adjacent to the abnormal acoustic source candidate position; and a determination unit configured to determine whether the abnormal acoustic source candidate local area or the abnormal acoustic source candidate position is an abnormal acoustic source based on the classified acoustic scene and the recognized object type, wherein the acoustic feature image generation unit is configured to extract a time-domain acoustic signal of a representative position belonging to the abnormal acoustic source candidate local area, and generate the acoustic feature image from the time-domain acoustic signal of the representative position, wherein the representative position is a local maximum position of the abnormal acoustic source candidate local area.

11. The AI acoustic image camera of claim 10, wherein the abnormal acoustic source candidate local area selecting unit is further configured to group positions having acoustic levels exceeding a predefined level to form the abnormal acoustic source candidate local area.

12. The AI acoustic image camera of claim 10, wherein the abnormal acoustic source candidate local area selecting unit is further configured to use whether an acoustic level gradually increases toward a central portion of the abnormal acoustic source candidate local area as a parameter for selecting the abnormal acoustic source candidate local area.

13. The AI acoustic image camera of claim 10, wherein the acoustic feature image generation unit is further configured to generate the acoustic feature image by imaging at least one feature parameter selected from a discrete wavelet transform (DWT), multi-resolution short-time Fourier transform, mel filterbank, log mel filterbank energy, mel-frequency filterbank conversion, and multi-resolution log-mel spectrogram.

14. The AI acoustic image camera of claim 10, wherein the acoustic analysis unit is further configured to classify the acoustic scene using an artificial intelligence model learned to classify the acoustic scene from the acoustic feature image.

15. The AI acoustic image camera of claim 10, wherein the object recognition unit is further configured to recognizing the object using an artificial intelligence model learned to classify the object type from the object image.

16. The AI acoustic image camera of claim 10, the AI acoustic image camera further comprising:

an alarm unit configured to generate an alarm signal when the abnormal acoustic source candidate local area or the abnormal acoustic source candidate position is determined to be an abnormal; and a transmission unit configured to transmit an optical-acoustic image, in which an optical video image and an acoustic field visualizing image are overlapped.

17. A method for determining an abnormal acoustic source using artificial intelligence, the method comprising:

an acoustic data acquisition step of acquiring acoustic data through an acoustic sensor array;

an acoustic source localizing step of estimating a position of the acoustic source by calculating an acoustic level of the acoustic source at each location based on the acquired acoustic data;

an acoustic classifying step of classifying the acoustic source as one of at least one pre-learned acoustic scene;

an object type determination step of determining a type of an object through image analysis of an area within a critical distance from the acoustic source;

a determining step of determining whether the acoustic source is an abnormal acoustic source based on the classified acoustic scene and the recognized object type, wherein in the acoustic feature image generating step comprises:

a step of extracting a time-domain acoustic signal of a representative position belonging to the abnormal acoustic source candidate local area; and a step of generating the acoustic feature image from the time-domain acoustic signal of the representative position, wherein the representative position is a local maximum position of the abnormal acoustic source candidate local area.

18. The method of claim 17, wherein the determining step further comprises a step of determining the abnormal acoustic source if the classification of the acoustic scene, the type of the recognized object, and a predefined monitoring target range are all matched.

* * * * *